US009268669B2

(12) United States Patent
Salloum et al.

(10) Patent No.: US 9,268,669 B2
(45) Date of Patent: Feb. 23, 2016

(54) APPLICATION QUALITY TESTING TIME PREDICTIONS

(75) Inventors: Ghassan G. Salloum, Seattle, WA (US); Benjamin T. Grover, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 533 days.

(21) Appl. No.: 13/352,118

(22) Filed: Jan. 17, 2012

(65) Prior Publication Data

US 2013/0185246 A1 Jul. 18, 2013

(51) Int. Cl.
*G06N 7/02* (2006.01)
*G06F 11/36* (2006.01)
*H04L 12/26* (2006.01)
*H04L 29/08* (2006.01)

(52) U.S. Cl.
CPC ............ *G06F 11/3672* (2013.01); *H04L 43/50* (2013.01); *H04L 67/30* (2013.01)

(58) Field of Classification Search
CPC .......... G06F 2221/033; G06F 11/1438; G06F 11/3409; G06N 99/00
See application file for complete search history.

(56) References Cited

U.S. PATENT DOCUMENTS

| 6,402,028 | B1 * | 6/2002 | Graham et al. ............... 235/380 |
| 7,120,648 | B2 * | 10/2006 | Garth et al. |
| 7,945,909 | B2 * | 5/2011 | Mariotti et al. ............... 718/100 |
| 8,418,147 | B1 * | 4/2013 | Odenwelder et al. ......... 717/128 |
| 8,566,803 | B2 * | 10/2013 | Branson et al. ............... 717/135 |
| 8,661,412 | B2 * | 2/2014 | Salloum et al. ............... 717/124 |
| 2003/0163469 | A1 * | 8/2003 | Garth et al. ....................... 707/9 |
| 2003/0233387 | A1 | 12/2003 | Watanabe et al. |
| 2004/0078684 | A1 * | 4/2004 | Friedman et al. ............... 714/38 |
| 2004/0154000 | A1 * | 8/2004 | Kasravi et al. ................ 717/130 |
| 2004/0243457 | A1 * | 12/2004 | D'Andrea et al. ................. 705/9 |
| 2005/0143630 | A1 * | 6/2005 | Darby et al. .................. 600/300 |
| 2006/0106842 | A1 * | 5/2006 | Diament et al. .............. 707/101 |
| 2007/0179646 | A1 * | 8/2007 | Dempski et al. ................ 700/83 |

(Continued)

OTHER PUBLICATIONS

Iqbal, Azlan, "Estimating Time to Completion Uncertain Processing Times in Games", Retrieved at <<http://ieeexplore.ieee.org/stamp/stamp.jsp?tp=&arnumber=6000360>>, Proceedings of the 16th International Conference on Computer Games, Jul. 27-30, 2011, pp. 59-62.

*Primary Examiner* — Jeffrey A Gaffin
*Assistant Examiner* — Paulinho E Smith
(74) *Attorney, Agent, or Firm* — Bryan Webster; Kate Drakos; Micky Minhas (57) ABSTRACT

Techniques for application quality testing time predictions are described that provide customized processing time predictions for application testing. Testing times for various stages of testing are collected during application testing. The collected testing data may be stored in association with various attribute values ascertained for the applications. The collected timing data is used to predict processing times for applications that match defined profiles. The profiles may be defined to include selected attributes and values used to identify applications having corresponding attributes and values. The collected timing data may be processed to derive predictions for processing times on a profile-by-profile basis. When a new application is submitted, the application is matched to a particular profile based on attribute values possessed by the application. Then, processing time predictions associated with the matching profile may be obtained, assigned to the application, and output for presentation to a developer of the application.

20 Claims, 6 Drawing Sheets

(56) References Cited

U.S. PATENT DOCUMENTS

| | | |
|---|---|---|
| 2009/0328046 A1 | 12/2009 | Proctor et al. |
| 2011/0138397 A1 | 6/2011 | Kikuchi |
| 2012/0036552 A1* | 2/2012 | Dare et al. ............... 726/1 |
| 2012/0072283 A1* | 3/2012 | DeVore et al. ......... 705/14.49 |
| 2012/0072968 A1* | 3/2012 | Wysopal et al. ........... 726/1 |
| 2012/0110174 A1* | 5/2012 | Wootton et al. ......... 709/224 |
| 2012/0131387 A1* | 5/2012 | Salloum et al. ......... 714/38.1 |
| 2012/0143791 A1* | 6/2012 | Sathish .................. 706/12 |
| 2012/0191619 A1* | 7/2012 | Gross .................... 705/310 |
| 2012/0278180 A1* | 11/2012 | Agarwal et al. ........ 705/14.71 |
| 2013/0024729 A1* | 1/2013 | Salloum et al. ........... 714/25 |
| 2013/0036069 A1* | 2/2013 | Salloum et al. ......... 705/347 |
| 2013/0123956 A1* | 5/2013 | Fernandez ................ 700/91 |
| 2013/0185246 A1* | 7/2013 | Salloum et al. ........... 706/52 |
| 2014/0011496 A1* | 1/2014 | Elliott et al. ............ 455/424 |

* cited by examiner

APPLICATION QUALITY TESTING TIME PREDICTIONS

BACKGROUND

The amount of application content consumed by users of various computing devices including tablet devices, laptops, mobile phones, desktop computers, and so forth, is ever-increasing. To assist users in obtaining application content, a service provider may provide an application store through which users may access, browse, select, purchase, and/or download applications for their devices. To ensure the integrity of the store and quality of application provided, the service provider may conduct quality testing on applications submitted by third party developers for distribution via the store before releasing the applications to the store.

As this quality testing may take some time, developers may be interested in tracking progress of the quality review. Traditionally, limited information is provided to developers regarding the progress of testing being performed on their applications. For example, a "one-size-fits-all" approach may provide just a generic or average overall testing time that is used for all different kinds of applications and developers. Using generic/average overall testing times fails to account for individual characteristics of different application submissions and may not be very accurate for many applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for application quality testing time predictions are described that provide customized processing time predictions for application testing. Testing times for various stages of testing are collected during application testing. The collected testing data may be stored in association with various attribute values ascertained for the applications. The collected timing data is used to predict processing times for applications that match defined profiles. The profiles may be defined to include selected attributes and values used to identify applications having corresponding attributes and values. The collected timing data may be processed to derive predictions for processing times on a profile-by-profile basis. When a new application is submitted, the application is matched to a particular profile based on attribute values possessed by the application. Then, processing time predictions associated with the matching profile may be obtained, assigned to the application, and output for presentation to a developer of the application.

BRIEF DESCRIPTION OF THE DRAWINGS

The same numbers are used throughout the drawings to reference like features.

DETAILED DESCRIPTION

Overview

Techniques for application quality testing time predictions are described that provide customized processing time predictions for application testing. Testing times for various stages of testing are collected during application testing. The collected testing data may be stored in association with various attribute values ascertained for the applications. The collected timing data is used to predict processing times for applications that match defined profiles. The profiles may be defined to include selected attributes and values used to identify applications having corresponding attributes and values. The collected timing data may be processed to derive predictions for processing times on a profile-by-profile basis. When a new application is submitted, the application is matched to a particular profile based on attribute values possessed by the application. Then, processing time predictions associated with the matching profile may be obtained, assigned to the application, and output for presentation to a developer of the application.

In the discussion that follows, a section titled "Operating Environment" is provided and describes one environment in which one or more embodiments can be employed. Following this, a section titled "Example Procedures" describes example techniques for application quality testing time predictions in accordance with one or more embodiments. Next, a section titled "Example User Interface" describes example user interfaces in accordance with one or more embodiments. Last, a section titled "Example System" describes example computing systems and devices that can be utilized to implement one or more embodiments.

Operating Environment

Figure 1:
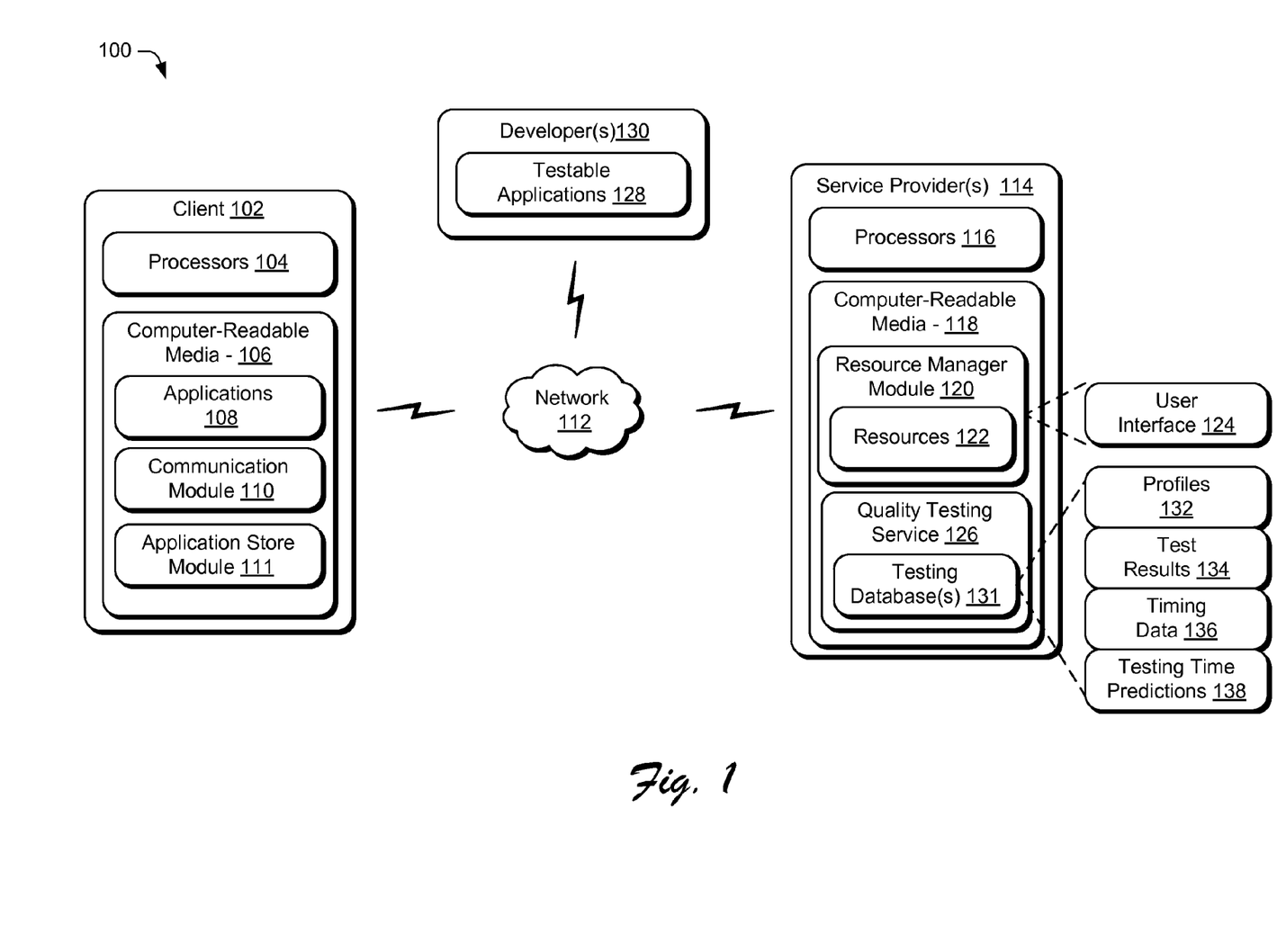
FIG. 1 illustrates an operating environment in which various principles described herein can be employed in accordance with one or more embodiments of application quality testing time predictions.

FIG. 1 illustrates an operating environment in accordance with one or more embodiments, generally at 100. Environment 100 includes a client 102 having one or more processors 104, one or more computer-readable media 106 and one or more applications 108 that reside on the computer-readable media and which are executable by the processor(s). The client 102 can be embodied as any suitable computing system and/or device such as, by way of example and not limitation, a desktop computer, a portable computer, as tablet computer, a handheld computer such as a personal digital assistant (PDA), a cell phone, a set-top box, and the like. One example of a computing system that can represent various systems and/or devices including the client 102 is shown and described below in FIG. 6.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 6.

In addition, client 102 includes a software application in the form of a communication module 110. The communication module 110 represents functionality of the client 102 operable to communicate with and interact with various other entities (e.g., other clients, providers, servers, web sites). For example, the communication module 110 may be configured as a web browser. Interactions with other entities can include sending and receiving electronic messages in various forms (e.g., e-mail, instant messages, text messages, and so forth) between the entities, obtaining resources (e.g., content and services) from the other entities, accessing and/or downloading various applications 108 from an online application catalog or store, and so forth.

The client 102 can also include an application store module 111 that represents functionality for enabling access of the clients to an online application database, catalog, or store (e.g., an application marketplace) through which various applications 108 can be made available to clients. Applications from a variety of developers may be made available to clients through interactions of the application store module 111 with one or more service providers. The application store module 111 can be implemented in various ways to facilitate access to and navigation of a database of applications 108, selection and/or purchase of applications, and download of applications to the client 102. The application store module 111 can be implemented as a standalone client application and/or as a component of the communication module 110, such as being implemented as an add-in for a web browser. The application store module 111 can also be implemented as web-hosted application that the client 102 can access and run in conjunction with a service provider over a network (e.g., "in the cloud").

For instance, the client 102 can be communicatively coupled over a network 112, such as the Internet, with one or more service providers 114 from and to which resources (e.g., content and services) can be received and sent. Example service providers 114 of FIG. 1 are each depicted as having one or more processors 116 and one or more computer-readable media 118. A service provider 114 can be implemented by way of one or more server devices. Accordingly, various example components represented and described for a service provider 114 can be included on a single server device and/or can be divided between multiple different server devices.

The service provider 114 is depicted as including a resource manager 120. The resource manager 120 represents functionality operable by the service provider 114 to manage various resources 122 that may be made available over the network 112. For example, various resources 122 can be provided by way of web pages, HTML pages, application UIs, or other user interfaces 124 that are communicated over the network 112 for output by the client 102. The resource manager 120 can manage access to the resources 122, performance of the resources 122, configuration of user interfaces 124 or data to provide the resources 122, and so on.

Generally, resources 122 made accessible by a service provider 114 can include one or more services and/or content. A service provider 114 can provide one or more web servers and/or sites, which a client 102 can navigate to in order to access the resources 122. The resources 122 can include any suitable combination of services and/or content typically made available over a network by one or more providers. Some examples of services include, but are not limited to, an application store service to manage and provide client access to a database of applications 108, a quality testing service to perform testing of applications submitted by developers for the application store, a search service, an email service to send and receive email, an instant messaging service to provide instant messages between clients 102, and a social networking service to facilitate connections and interactions between groups of users who share common interests and activities. Additional examples of services include a shopping service, a weblog service, productivity service, an authentication service, a news service, and an advertisement service to name a few. Content may include various combinations of text, video, ads, audio, multi-media streams, animations, images, web pages, web applications, device applications, content for display by a browser or other device application, pages, URLS, and/or links for use by an application store module 111, and the like.

In addition, the service provider 114 can include or otherwise make use of quality testing service 126 configured to perform testing upon applications submitted for inclusion in an application store. The quality testing service 126 may also implement techniques for application quality testing time predictions described herein.

For example, a variety of testable applications 128 can be collected from one or more developers 130 for inclusion in an application store, over the network 112 or otherwise. The developers 130 represent third party developers, device manufacturers, and other third parties who may develop applications and distribute the applications to clients using the application store infrastructure managed by the service provider 114 and represented by the example environment 100 depicted in FIG. 1. Developers 130 can publish the applications they develop through the service provider 114. Clients 102 can then navigate and select applications for download from the application store, such as by using the application store module 111. To control the integrity of the application store and quality of applications provided, the service provider 114 through the quality testing service 126 may perform various quality testing upon applications before approving the applications and/or releasing the applications to the store.

To conduct testing and perform techniques for application quality testing time predictions, the quality testing service 126 may include or otherwise make use of one or more testing databases 131 that represent various data related to application testing and processing time predictions. By way of example, the testing databases 131 are illustrated as storing profiles 132 defined to include selected attributes and values that can be used to match applications to particular profiles, test results 134 that describe results of application testing in any suitable way and may indicate how the application performed and/or whether or not the application passed, test timing data 136 that may be collected for different stages of testing, and testing time predictions 138 that may be generated based at least in part upon the test timing data 136. In at least some embodiments, testing time predictions 138 are generated on a profile-by-profile basis. Then, predictions associated with a particular profile may be assigned to and used for an application that is determined to have attributes corresponding to the particular profile. Further details regarding these and other aspects of techniques for application quality testing time predictions may be found in relation to the following figures.

Figure 2:
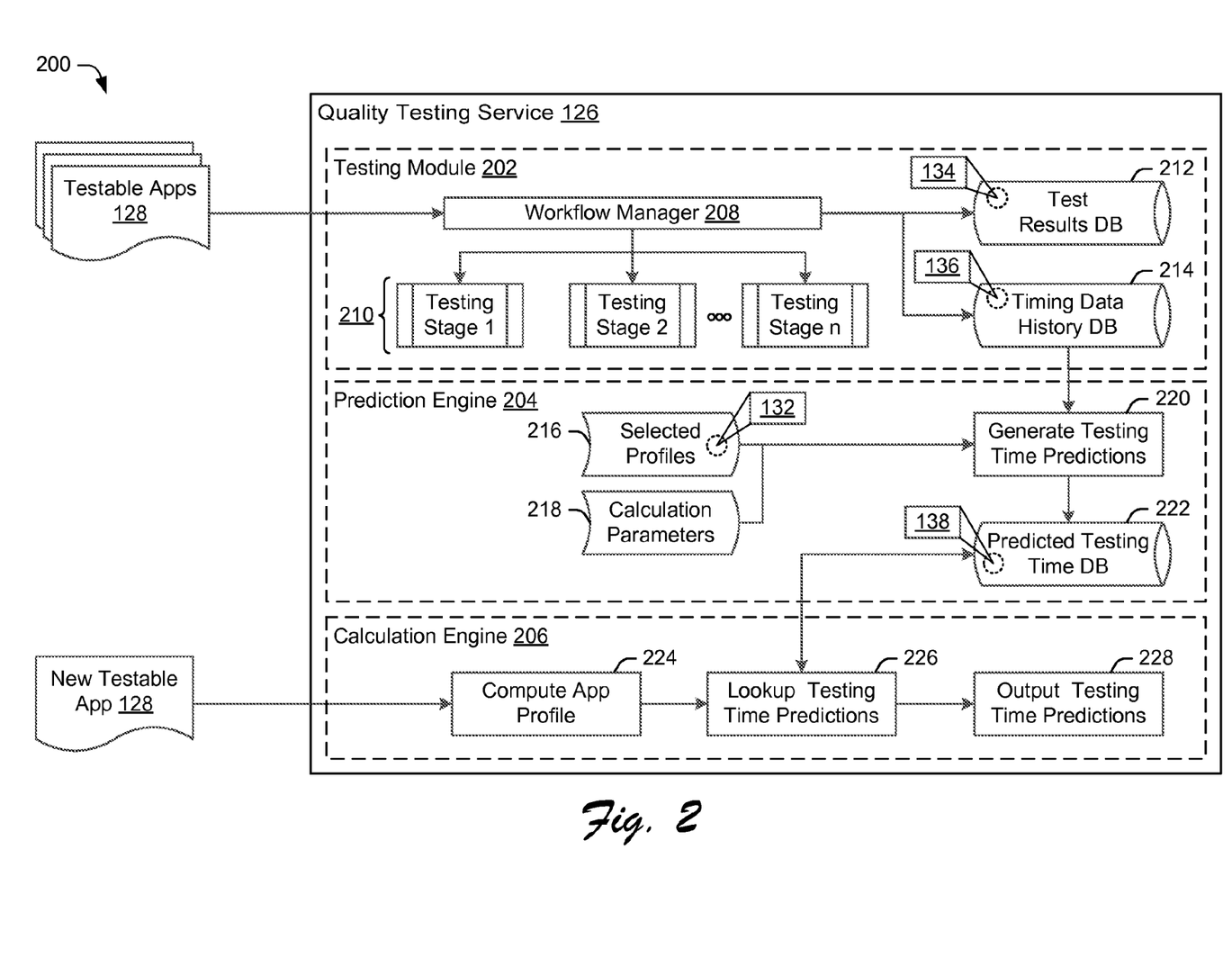
FIG. 2 illustrates details of an example quality testing service in accordance with one or more embodiments.

To further illustrate, consider now FIG. 2, which depicts an example quality testing service 126 of FIG. 1 in greater detail and also represents an example testing time prediction scenario, generally at 200. The example quality testing service 126 is depicted as including a testing module 202, a prediction engine 204, and a calculation engine 206 that represent distinct functionality provided by the quality testing service 126. Naturally, the functionality represented by one or more example modules, components, and/or devices herein may be further divided or combined in various different ways to implement the described techniques, and is not limited to the depicted examples.

The testing module 202 represents functionally operable to perform testing upon testable applications 128 submitted to the service provider 114. In at least some embodiments the testing involves processing submitted applications to verify that the applications meet criteria established for inclusion in an application store and determine whether or not to certify the applications for the store. This processing may include various automated and/or manual testing, ratings, and reviews of the application. Multiple processing tasks for quality testing of an application may be organized into multiple different designated stages of testing.

As depicted, the testing module 202 may implement a workflow manager 208 to manage the testing processes through multiple testing stages 210. For instance, the workflow manager 208 may operate to move applications from stage to stage, keep track of stage progress, prompt processing units (automated and/or manual) to initiate stages, open/close stages, collect test results 134 and timing data 136, and so forth. The workflow manager 208 may cause storage of test results 134 in a test results database 212. The test results 134 may be provided back to developers in any suitable way, such as by sending the results in an email or other message, providing a web-based interface to access the results, posting the results, and so forth.

The workflow manager 208 may operate to collect timing data 136 for multiple testing stages 210 as well as determining overall times for the application testing. The timing data 136 collected in connection with quality testing of applications may be configured in any suitable way. In one approach, timestamps may be collected before and after testing and/or before and after each stage. The timing data 136 may be recorded or otherwise stored in a timing data history database 214 as shown in FIG. 2. Generally speaking, the timing data history database 214 associates timing for testing stages with the applications that were tested. In addition, the timing data 136 maintained in the database may also be associated, directly or indirectly, with values for profile attributes associated with the applications. Further details regarding profile attributes and profiles are discussed below. Collecting and recording timing data stage-by-stage in this manner enables testing time predictions 138 to be subsequently generated at a granular level corresponding to the designated stages for testing. In other words, predictions may be made individually for each testing stage.

Each of the testing stages 210 represents a designated collection of processing sub-steps and/or sub-systems in the overall workflow for application quality testing. Testing stages 210 may include automated processing, manual reviews, and/or combination thereof. A variety of different testing stages 210 are contemplated. By way of example and not limitation, testing stages 210 may include an antivirus stage to check for viruses and malicious code, a profiling stage to collect profile attribute values and other data regarding applications, a profanity filter stage and/or a content filter stage to check for content that may be disapproved and/or may alter a rating given to an application, a quality rating stage to assess the quality of applications, a compatibility stage to ensure the application works and is stable, and so forth.

The prediction engine 204 represents functionality operable to generate predictions for quality testing of applications based at least in part upon timing data 136 collected by the testing module 202 in connection with previously conducted testing. As represented in FIG. 2, the prediction engine 204 at 216 may operate to determine selected profiles 132 used to make predictions. The prediction engine 204 may also be encoded with various configurable calculation parameters 218 that may be set to define, tune, and/or control a prediction algorithm used by the prediction engine 204 to generate predictions. Using the selected profiles and calculation parameters, the prediction engine 204 at 220 processes timing data 136 collected and recorded by the testing module 202 to generate predictions. As further shown, the testing time predictions 138 generated by the prediction engine 204 may be stored in a predicted testing time database 222.

More particularly, the prediction engine 204 may be configured to generate testing time predictions 138 on a profile-by-profile basis for multiple defined profiles 132. Predictions may be generated on-demand and/or automatically at designated times (e.g., after a selected/configurable number of applications have been tested, on a periodic schedule (hourly, daily, weekly, etc.), when new data matching a particular profile is detected, and so forth). The testing time predictions 138 for a particular profile 132 may include an overall prediction and individual predictions corresponding to each testing stage 210. Predictions made for a profile account for the profile attributes/values of applications corresponding to the profile.

For instance, a developer may employ the prediction engine 204 to define and designate different profiles 132 to use for analysis of timing data 136 collected for testable applications 128. This may involve selecting attributes and attribute values to define different profiles of interest. Profile attributes associated with timing data 136 may be compared to the selected profiles and attributes associated with the profiles to match applications to corresponding profiles, and categorize the applications according to the different profiles. In this way, the timing data 136 associated with applications may be organized according to designated profiles and may be examined/analyzed to determine predictions on a profile-by-profile basis.

As mentioned, profiles 132 may be defined that each includes selected profile attributes and values that can be used to match applications to particular profiles. Applications that have profile attributes and values corresponding to a particular profile are said to "match" the profile. A variety of different kinds of attributes for profiles (e.g., profile attributes) and selected values of the attributes may be employed to define different profiles 132. By way of example and not limitation, profile attributes and values associated with applications and used to create profiles may generally include inherent characteristics of applications and submissions, attributes determined by various application analysis, and/or system data regarding the system workload and capabilities to handle applications. Some particular examples of profile attributes include application type or category data, languages and/or types of languages supported, complexity of the applications, size, and timing of the application submissions. Additional examples include hardware and/or software dependencies, market and distribution data, developer reputation, historic processing patterns, seasonal data, attributes obtained from an application manifest, attributes collected from a profile form/survey submitted with an application, and so forth. These and other profile attributes may be ascertained by processing of submitted applications as part of the quality testing or otherwise.

Thus, the prediction engine 204 may use profiles and calculation parameters to derive predictions for testing times on a profile-by-profile basis. The prediction engine 204 may be configured to apply various algorithms to collected timing data to compute the predictions. In general, a suitable algorithm is configured to compute predicted times for each selected profile including a predicted overall time and times for each stage of processing. The particulars of the predictions may be controlled using various calculation parameters 218. Calculation parameters 218 may be set to account for different factors that influence the test times and adjust computed testing times up or down accordingly. For example, calculation parameters 218 may include factors to account for seasonal variances in testing times, age-dependent weights applied to historic timing data, error adjustment parameters, fluctuations in testing resources and/or capacity, weights and testing time differences for particular application categories or types, a padding margin or percentage to apply to computed times, developer specific reputation factors, and so forth. Accordingly, the testing time predictions 138 may be determined based upon historical testing times that may be adjusted to account for various factors that affect the times. For instance, the generated predictions may combine statistical analysis of collected timing data and adjustments controlled by the calculation parameters 218 to account for the various factors.

The calculation engine 206 represents functionality operable to determine predicted testing times for a new testable application 128. To do so, the calculation engine at 224 may compute a profile for an application that is submitted for testing. Here, the calculation engine 206 may determine profile attributes for the submitted application from different sources. The different sources may include a profile form or survey submitted with the application, an analysis of inherent properties of the application, known system constraints and/or trends, and so forth.

Once a profile and/or attributes associated with an application are determined, the calculation engine 206 at 226 may look-up or otherwise obtain testing time predictions that match the application, application profile, and/or particular attributes and values of the application. For instance, the application may be matched to a designated profile by comparing attributes values of the application with different profiles. When a matching profile for the application is found, corresponding testing time predictions 138 associated with the matching profile may be retrieved from the predicted testing time database 222.

Further, the calculation engine 206 at 228 may output the testing time predictions 138 for presentation to a developer, owner, or other users who have submitted applications. Predictions may be output in various ways. For instance, a web-based interface may be exposed to enable access to testing time predictions 138 associated with testable applications 128. In this case, a web page or other user interface 124 for the web-based interface may be configured to display the testing time predictions 138 and enable various user interaction with the displayed predictions. In another approach, a message such as an email, text message, or instant message having the testing time predictions 138 may be sent to appropriate messaging accounts associated with application submissions to provide notification of the predictions. Additional details regarding ways in which testing time predictions 138 may be output can be found in relation to the discussion below of an example user interface depicted in FIG. 5.

Having described an example operating environment, consider now example procedures for application quality time testing predictions in accordance with one or more embodiments.

Example Procedures

The following section provides a discussion of flow diagrams that describe example procedures for application quality time testing predictions in accordance with one or more embodiments. The procedures can be implemented in connection with any suitable hardware, software, firmware, or combination thereof. In at least some embodiments, the methods can be implemented by way of a suitability configured computing device, such as the example service provider 114 of FIG. 1 that includes or otherwise makes use of a quality testing service 126. The procedures are shown as a set of blocks that specify operations performed by one or more devices and are not necessarily limited to the orders shown for performing the operations by the respective blocks. In portions of the following discussion, reference will be made to the example operating environment described in relation to FIG. 1 and FIG. 2.

Figure 3:
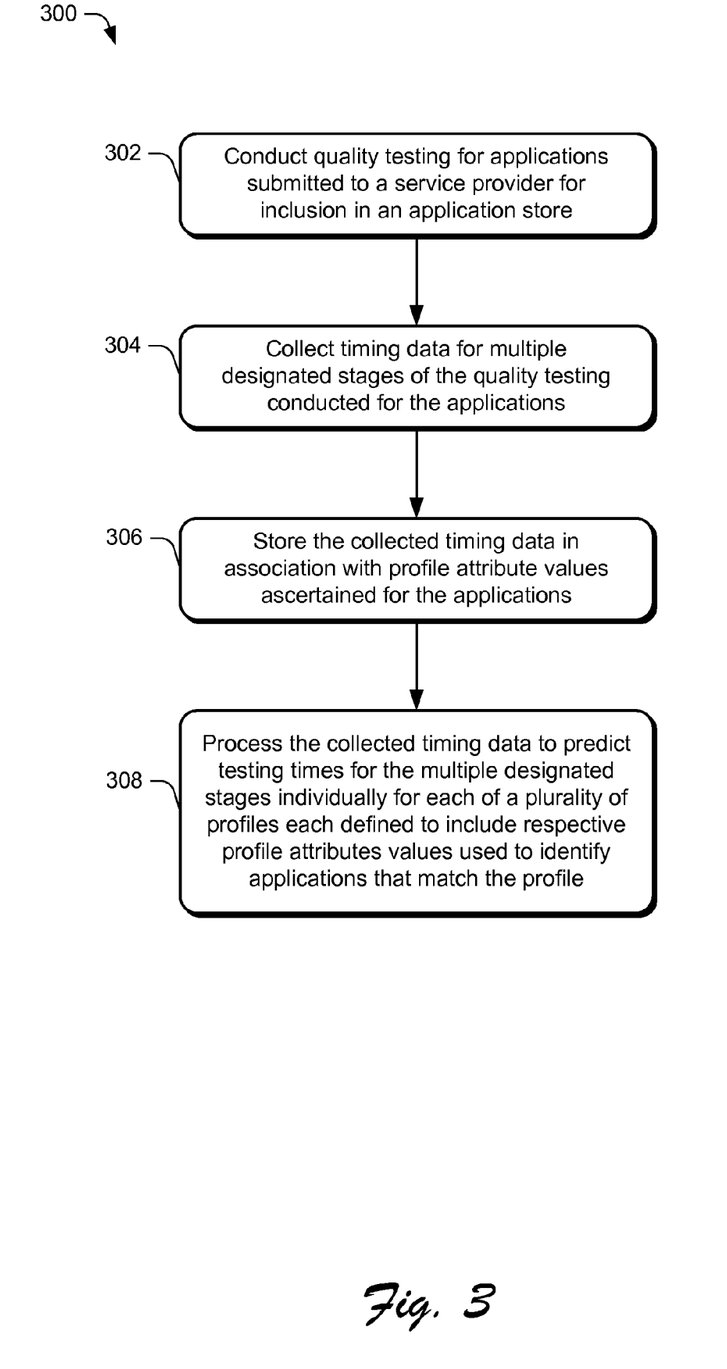
FIG. 3 is a flow diagram that describes an example procedure for predicting testing times for testing stages in accordance with one or more embodiments.

FIG. 3 is a flow diagram that describes an example procedure 300 for predicting testing times for testing stages in accordance with one or more embodiments. Quality testing is conducted for applications submitted to a service provider for inclusion in an application store (block 302). For example, applications submitted to a service provider 114 may be tested by a quality testing service 126 as described previously. The testing generally involves multiple stages to check the quality of an application and ensure that the application is suitable for inclusion in an application store provided by the service provider 114. The quality testing service 126 may coordinate the multiple stages of testing, obtain and store testing results, provide the results back to application submitters, and determine whether or not to enable particular applications to use the application store according to the results.

Timing data is collected for multiple designated stages of the quality testing conducted for the applications (block 304) and the collected timing data is stored in association with profile attribute values ascertained for the applications (block 306).

In particular, the quality testing service 126 may be configured to collect timing data 136 that indicates how long application testing takes overall and for individual stages. The collected timing data may also be related to application profile data (e.g., profiles, profile attributes, and values) associated with corresponding applications. For instance, the quality testing service 126 may store the timing data 136 in relation to application profile data in a timing data history database 214 or other suitable storage. The application profile data associated with timing data 136 may be obtained as part of testing conducted on submitted applications. For instance, a profiling stage may be implemented to analyze applications and create a profile for the applications that describes various attributes and attribute values possessed by the applications. The application profile data can be associated with timing data and can also be used to match applications to designated profiles that are defined for testing predictions.

The collected timing data is processed to predict testing times for the multiple designated stages individually for each of a plurality of profiles each defined to include respective profile attributes values used to identify applications that match the profile (block 308). Consider for example a testing process for applications that includes three stages: an anti-virus stage, a profanity filter stage, and a content review stage. For the example process, timing data for multiple applications may be collected and stored in association with application profile data as previously described. The timing data may include times corresponding to each of the three stages.

The quality testing service 126 may include or otherwise make use of a prediction engine 204 to analysis the timing data to generate testing time predictions 138. The predictions may be determined individually for multiple designated profiles such as selected profiles discussed previously. For example, test times for each of the three stages may be computed for different selected profiles input to the prediction engine 204.

For each particular profile, the prediction engine 204 obtains corresponding timing data 136 that matches profile attributes and values for the particular profile. For instance, the prediction engine 204 may filter the timing history database 214 to discover data that matches the particular profile. The prediction engine 204 may then apply a prediction algorithm to compute testing time predictions for applications that match the particular profile including an overall testing time and testing times for each stage. The prediction process may be repeated for each selected profile submitted to the prediction engine 204.

In one approach, the prediction algorithm may be configured to generate the predictions by computing statistical time values for the testing and the three stages from the historic timing data relative to attribute values selected for the particular profile. In addition or alternatively, the prediction algorithm may be configured to apply various calculation parameters 218 to adjust the statistical time values to account for various factors as discussed in relation to FIG. 2. The prediction algorithm may compute and utilize one or more different statistical time values to derive predictions including but not limited to average, maximum, and/or minimum times, spread, deviation, variance, and other suitable values that may be obtained by analyzing the historic timing data. In this manner, testing times predictions 138 may be generated individually for different testing stages 210 and for each of a plurality of selected profiles 132.

Figure 4:
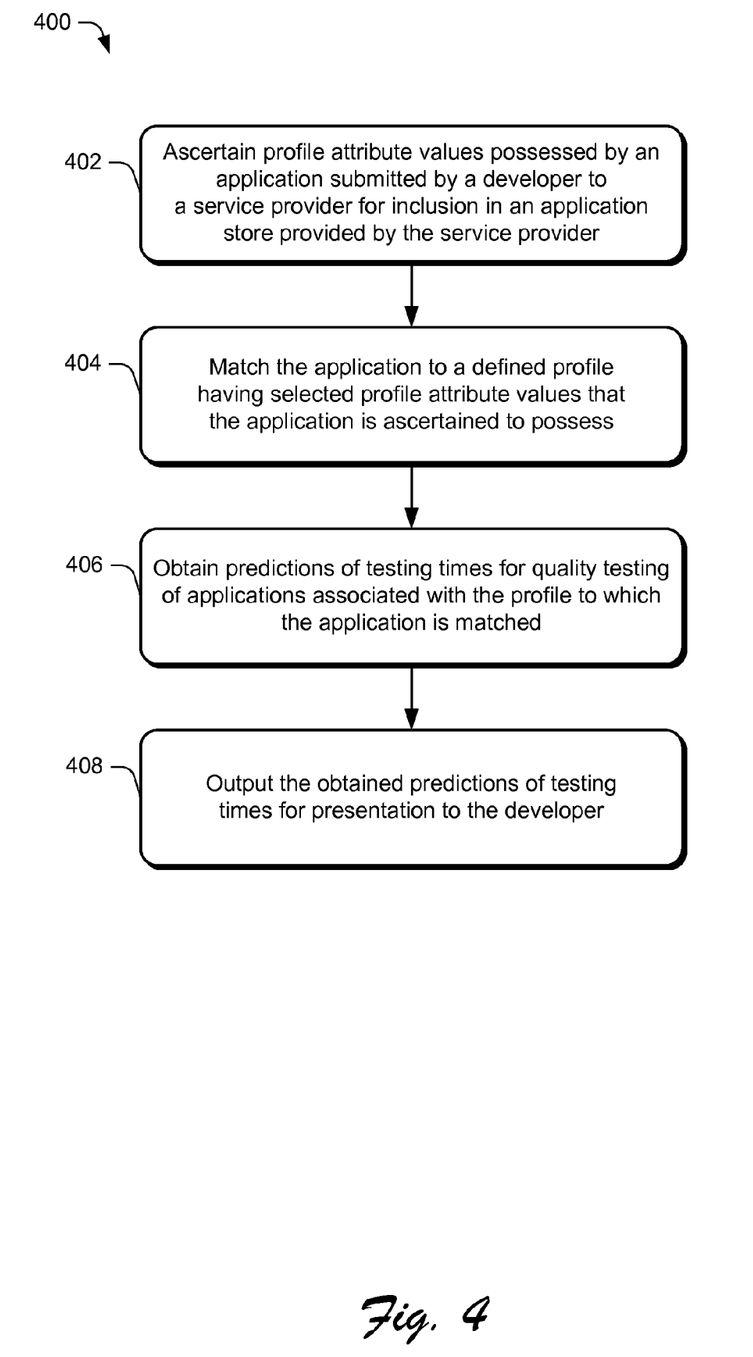
FIG. 4 is a flow diagram that describes an example procedure for matching an application to predicted testing times in accordance with one or more embodiments.

FIG. 4 is a flow diagram that describes an example procedure 400 for matching an application to predicted testing times in accordance with one or more embodiments. Profile attribute values possessed by an application submitted by a developer to a service provider for inclusion in an application store provided by the service provider are ascertained (block 402). For example, quality testing service 126 may include or otherwise make use of a calculation engine 206 configured to compute a profile for a testable application 128 as previously described. Computing the profile generally involves examining the application to discover profile attributes and values that the application possesses. To further illustrate, consider a simplified example in which profile attributes include application type, languages supported, size, complexity, and time of submission. With these example profile attributes, one example application may be profiled as a casual game, supporting two or less languages, small-sized, low complexity, and submitted in September. A different example application may be profiled as a business productivity application, supporting five or more languages, large-sized, moderate complexity, and submitted in mid-November. The profiles and profile attributes determined for the applications can be used to look-up or compute corresponding predictions.

In particular, the application is matched to a defined profile having selected profile attribute values that the application is ascertained to possess (block 404) and predictions are obtained of testing times for quality testing of applications associated with the profile to which the application is matched (block 406). Here, the quality testing service 126 may compare the profile attributes determined for an application to profile attributes associated with predictions. In at least some embodiments, predictions may be associated with predefined designated profiles. In this case, the quality testing service 126 may directly look-up the predictions by matching the application to a defined profile having selected profile attribute values that the application is ascertained to possess and retrieving corresponding predictions. Alternatively, the quality testing service 126 may be configured to generate predictions on demand for a particular application based on profile attributes determined for the application. In this approach, a set of attributes may be ascertained for an application and used to process stored timing data to generate a prediction for the application responsive to submission of the application. This may occur without relying upon or creating predefined designated profiles or generating predictions in advance.

The obtained predictions of testing times are output for presentation to the developer (block 408). As mentioned previously, predictions may be output in various ways including providing access to predictions through a web-based interface and/or sending notification messages to appropriate messaging accounts associated with application submissions. Further details regarding outputting predictions are discussed in the following section.

Having considered various example procedures for application quality testing time predictions, consider now an example user interface that can be employed to implement various aspects of application quality testing time predictions in accordance with one or more embodiments.

Example User Interface

Figure 5:
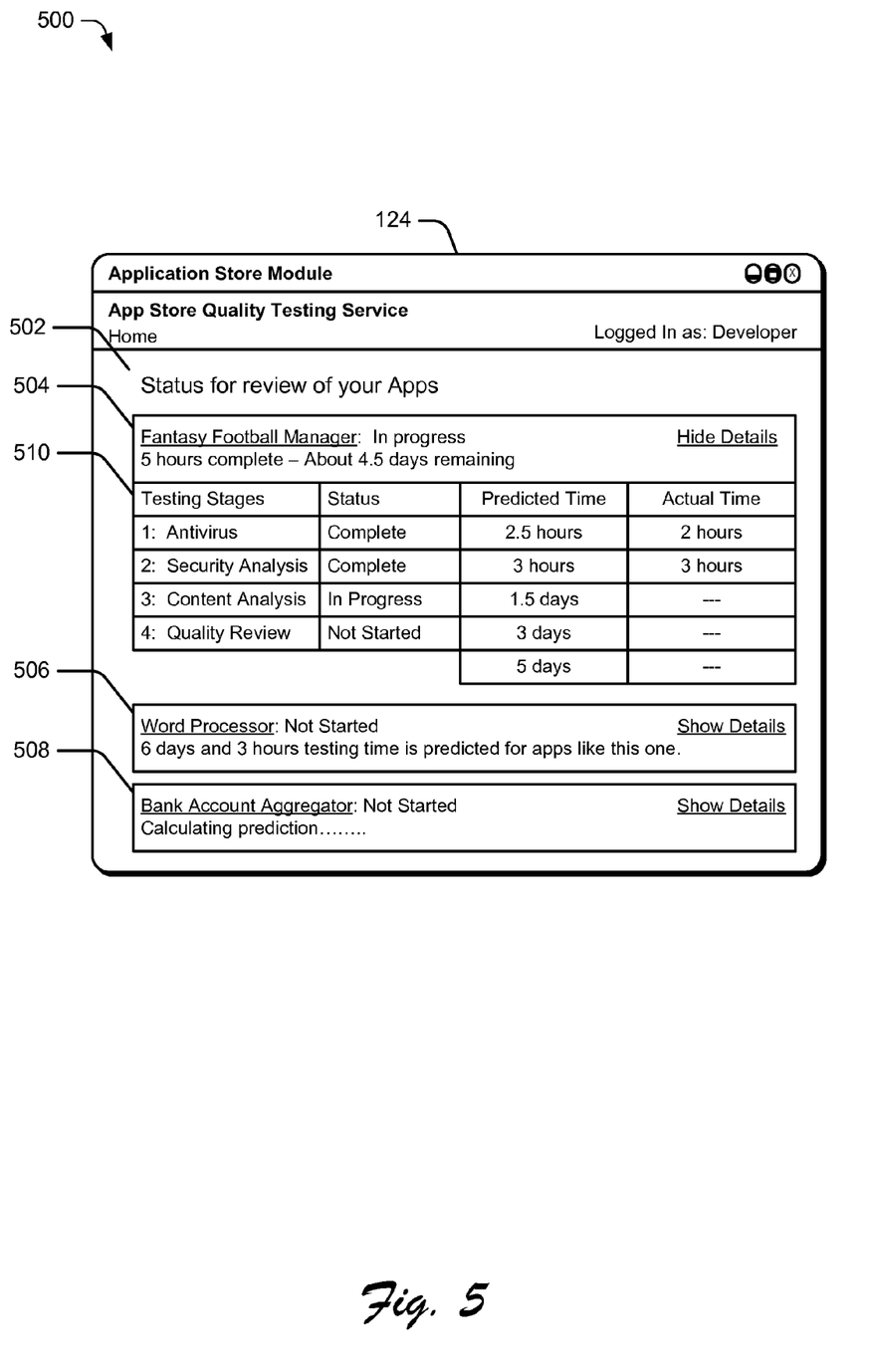
FIG. 5 is an example user interface in accordance with one or more embodiments.

FIG. 5 depicts generally at 500 one example of a user interface 124 for interaction with testing time predictions 138 that can be output via an quality testing service 126 and/or resource manager module 120 for distribution to a client 102. In this example, the user interface 124 includes a page 502 for an application quality testing service that can include various portions that are configured to present predictions and enable interaction with the predictions. The example page 502 represents a status review page that may correspond to a particular developer or user. Portions in the example page as well as in other pages can be configured in various ways to present testing time predictions 138. A message, such as an email or instant message, may be configured in a comparable manner as the example page to send testing time predictions 138 to a developer or other recipient as an electronic message.

In particular, the example page 502 can include a list of predictions corresponding to a user account for which the page is configured. In this case, the page corresponds to a logged-in user "Developer." The example page 502 enables the developer to review the testing status for one or more applications, which the developer has submitted to a service provider for testing. For example, testing time predictions 138 associated with three applications are illustrated in respective prediction summary portions 504, 506, and 508 of the example page 502. The prediction summary portions 504, 506, and 508 each show overall prediction and status information for a corresponding application. This may include indications of how long testing is expected to take, how much testing is completed, and/or how much testing time remains. The prediction summary portions 504, 506, and 508 may also include controls operable to selectively show or hide details regarding respective predictions.

In particular, respective prediction summary portion 504 corresponds to a fantasy football manager program for which testing is in progress. The prediction summary portion 504 indicates that five hours of testing are already complete and four and a half days of testing remain. Further a prediction detail portion 510 is exposed in relation to the fantasy football manager program that may be configured in various ways to show details of the prediction for the program. By way of example, the prediction detail portion 510 is configured as a table that shows prediction information individually for multiple stages of testing. The table lists different stages (antivirus, security analysis, content analysis, and quality review), status of each stage, the predicted times for each stage, and the actual times for stages that are already complete. The prediction detail portion 510 also shows the overall predicted and actual times. The prediction summary portion 504 includes a control that is selectable to hide the prediction detail portion 510 and present the prediction in a summary format comparable to the other example predictions shown in FIG. 5.

Prediction summary portion 506 corresponds to a word processor for which testing has not yet started. The prediction summary portion 506 indicates that six days and three hours of testing are expected for applications similar to the word processor. This prediction may have been generated based on a comparison of profile attributes of the word processor to a database of historic times and/or pre-generated profile-by-profile predictions as described previously. The prediction summary portion 506 includes a control that is selectable to show a prediction detail portion for the word processor. Selection of the control may expose a detail portion for the word processor that is comparable to the example prediction detail portion 510 for the fantasy football manager program.

Prediction summary portion 508 corresponds to a bank account aggregator for which testing has not yet started. The prediction summary portion 508 indicates that the prediction for the bank account aggregator is in the process of being calculated. In this case, the bank account aggregator may have been recently submitted and accordingly the prediction may not yet be ready. The prediction summary portion 508 also includes a control that is selectable to show a prediction detail portion that is comparable to the example prediction detail portion 510 for the fantasy football manager program.

Thus, a web page, user interface 124, or message such as the example of FIG. 5 may be provided to enable a developer to review submitted applications and see testing time predictions generated for the applications. Predictions for multiple applications may be presented in a single page or message. Functionality to show or hide details in a list of predictions may also be provided. Predictions for different applications may alternatively be provided by individual pages or messages. A summary page or message may be configured to provide links to individual pages for particular applications. Thus, testing time predictions may be output for presentation to a developer in a variety of ways, which include but are not limited to the described examples.

Having considered an example user interface for application quality testing time predictions, consider now an example system that can be employed to implement various aspects of application quality testing time predictions in accordance with one or more embodiments.

Example System

Figure 6:
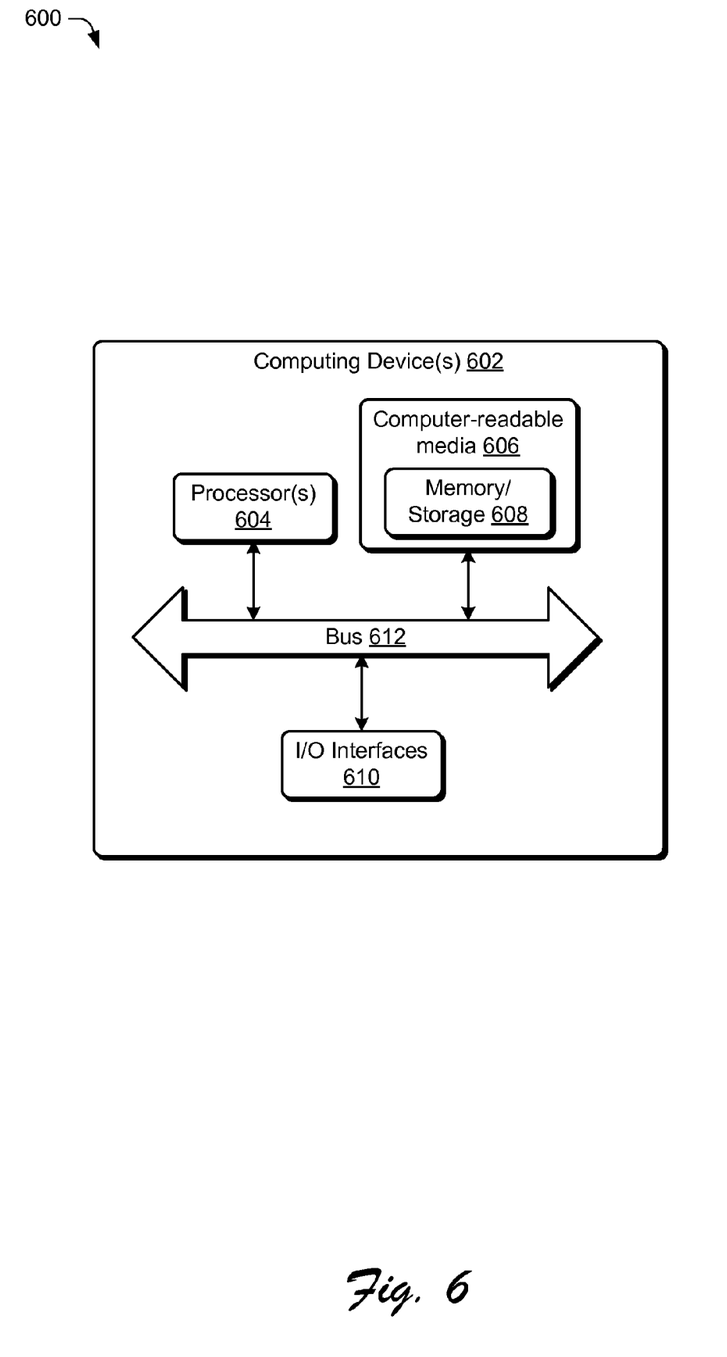
FIG. 6 illustrates an example computing system that can be used to implement one or more embodiments.

FIG. 6 illustrates an example system generally at 600 that includes an example computing device 602 that is representative of one or more such computing systems and/or devices that may implement the various embodiments described above. The computing device 602 may be, for example, a server of a service provider 114, a device associated with the client 102 (e.g., a client device), an on-chip system, and/or any other suitable computing device or computing system.

The example computing device 602 includes one or more processors 604 or processing devices, one or more computer-readable media 606 which may include one or more memory and/or storage components 608, one or more input/output (I/O) interfaces 610 for input/output (I/O) devices, and a bus 612 that allows the various components and devices to communicate one to another. Computer-readable media 606 and/or one or more I/O devices may be included as part of, or alternatively may be coupled to, the computing device 602. The bus 612 represents one or more of several types of bus structures, including a memory bus or memory controller, a peripheral bus, an accelerated graphics port, and a processor or local bus using any of a variety of bus architectures. The bus 612 may include wired and/or wireless buses.

The one or more processors 604 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 608 represents memory/storage capacity associated with one or more computer-readable media. The memory/storage component 608 may include volatile media (such as random access memory (RAM)) and/or nonvolatile media (such as read only memory (ROM), Flash memory, optical disks, magnetic disks, and so forth). The memory/storage component 608 may include fixed media (e.g., RAM, ROM, a fixed hard drive, etc.) as well as removable media (e.g., a Flash memory drive, a removable hard drive, an optical disk, and so forth).

Input/output interface(s) 610 allow a user to enter commands and information to computing device 602, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, programmable device logic and/or fixed device logic implemented in a hardware form that may be employed in some embodiments to implement at least some aspects of the described techniques. In this context, a hardware element may operate as a processing device that performs program tasks defined by instructions, modules, and/or logic embodied by the hardware element.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed or programmable logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via the network 112. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the resource manager module 120, applications 108, communication module 110, application store module 111, quality testing service 126, and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 602 may be configured to implement particular instructions and/or functions corresponding to the software and/or hardware modules implemented on computer-readable media. The instructions and/or functions may be executable/operable by one or more articles of manufacture (for example, one or more computing devices 602 and/or processors 604) to implement techniques for application quality testing time predictions, as well as other techniques. Such techniques include, but are not limited to, the example procedures described herein. Thus, computer-readable media may be configured to store or otherwise provide instructions that, when executed by one or more devices described herein, cause various techniques for application quality testing time predictions.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method comprising:
    conducting quality testing for applications submitted to a service provider for inclusion in an application store;
    collecting timing data for multiple designated stages of the quality testing conducted for the applications;
    storing the collected timing data in association with profile attribute values ascertained for the applications, the profile attribute values including at least an application type, number of language supported by the application, application complexity, size, and timing for application submissions; and
    processing the collected timing data to predict testing times for the multiple designated stages individually for each of a plurality of profiles defined to include respective profile attribute values used to match applications to corresponding profiles.

2. The computer implemented method of claim 1, further comprising ascertaining the profile attribute values for the applications as part of the quality testing.

3. The computer implemented method of claim 1, wherein processing the collected timing data comprises, for each particular profile of the plurality of profiles:
    obtaining timing data that matches the profile attribute values of the particular profile; and
    applying a prediction algorithm configured to compute statistical time values for each of the multiple designated stages based on the obtained timing data and adjust the statistical time values according to one or more calculation parameters set to account for one or more factors that influence testing times.

4. The computer implemented method of claim 1, further comprising processing the collected timing data to predict overall testing times associated with each of the plurality of profiles.

5. The computer implemented method of claim 1, further comprising:
    determining a matching profile of the plurality of profiles that matches a submitted application based on profile attribute values possessed by the submitted application; and
    assigning testing time predictions associated with the matching profile as predictions for the submitted application.

6. The computer implemented method of claim 5, further comprising configuring a user interface accessible via a web-based interface to present the predictions to a developer.

7. The computer implemented method of claim 5, further comprising sending a message having the predictions for the submitted application to a messaging account associated with the submitted application.

8. A computing system comprising:
    one or more processing devices;
    one or more computer-readable storage media configured to implement a quality testing service to generate testing time predictions for applications submitted to a service provider for inclusion in an application store, the quality testing service including:
    a testing module configured to conduct quality testing of the applications according to a plurality of testing stages and record testing times for each individual stage of the quality testing in association with profile attribute values ascertained for the applications, the profile attribute values including an application complexity value representative of an inherent complexity of the application as part of the quality testing;
    a prediction engine configured to use designated profiles to generate testing time predictions from the recorded testing times on a profile-by-profile basis, the designated profiles defined to include respective profile attributes values used to match applications possessing corresponding profile attributes values to testing time predictions associated with the designated profiles;
    a calculation engine configured to ascertain profile attributes values possessed by a particular application submitted to the service provider for quality testing, compare the profile attributes values possessed by the particular application to the designated profiles to match the application to a matching profile, and obtain testing time predictions associated with the matching profile to output as predictions for quality testing of the particular application.

9. The computing system of claim 8, wherein the testing time predictions associated with the matching profile include individual predictions for each of the plurality of stages.

10. The computing system of claim 8, wherein the quality testing service is further configured to expose a web-based interface to provide access to testing time predictions output via the calculation engine.

11. The computing system of claim 8, wherein the prediction engine is configured to generate testing time predictions for the designated profiles by, for each particular profile:
    obtaining timing data recorded by the testing engine that matches profile attributes values defined by the particular profile; and
    applying a prediction algorithm to compute testing time predictions associated with the particular profile.

12. The computing system of claim 11, wherein the prediction algorithm is configured to compute statistical time values for the particular profile based on the obtained timing data and apply one or more calculation parameters to adjust the statistical time values to account for one or more factors that influence the testing time predictions.

13. The computing system of claim 12, wherein the calculation parameters include factors to account for one or more of: seasonal variances in testing times, age of timing data, developer reputation, testing time differences for particular application categories, or a padding factor.

14. One or more computer-readable storage media including instructions, that when executed by a computing device, cause the computing device to implement a quality testing service configured to perform acts comprising:
    ascertaining profile attribute values possessed by an application submitted by a developer to a service provider for inclusion in an application store provided by the service provider, the profile attribute values including at least an application type, languages supported by the application, complexity of the application, size, and timing of the application submissions;
    matching the application to a defined profile having selected profile attribute values that the application is ascertained to possess;
    obtaining predictions of testing times for quality testing of applications associated with the profile to which the application is matched; and
    outputting the obtained predictions of testing times for presentation to the developer.

15. One or more computer-readable storage media of claim 14, further comprising generating testing time predictions for a plurality of selected profiles including the defined profile on a profile-by-profile basis by statistical analysis of historic timing data collected in connection with previously conducted quality testing for multiple applications.

16. One or more computer-readable storage media of claim 14, wherein outputting the obtained predictions of testing times comprises configuring a user interface corresponding to the developer and accessible via a network to display the obtained predictions for the application.

17. One or more computer-readable storage media of claim 14, wherein the predictions of testing times for quality testing of applications associated with the profile to which the application is matched include an overall testing time prediction and individual predictions for multiple stages of the quality testing.

18. One or more computer-readable storage media of claim 14, including one or more hardware elements configured to implement at least some of the instructions in hardware.

19. The computer implemented method of claim 1, the multiple designated stages of the quality testing including a profiling stage, an anti-virus stage, a profanity filter stage, a content review stage, or a quality rating stage.

20. The computing system of claim 8, wherein the prediction engine is encoded with configurable calculation parameters that are settable to define, tune, or control a prediction algorithm used by the prediction engine to generate the testing time predictions.

* * * * *